United States Patent
Mohammed et al.

(10) Patent No.: US 6,374,357 B1
(45) Date of Patent: Apr. 16, 2002

(54) SYSTEM AND METHOD FOR REGULATING A NETWORK SERVICE PROVIDER'S ABILITY TO HOST DISTRIBUTED APPLICATIONS IN A DISTRIBUTED PROCESSING ENVIRONMENT

(75) Inventors: Sohail B. Mohammed, North Bend; Kipley J. Olson, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/061,573

(22) Filed: Apr. 16, 1998

(51) Int. Cl.[7] .................................................. G06F 11/30
(52) U.S. Cl. ...................... 713/201; 709/328; 463/42; 713/176
(58) Field of Search .................................. 713/150, 165, 713/167, 176, 200, 201, 193; 705/51, 52, 59, 55, 54, 57; 709/217, 218, 219, 225, 226, 229, 227, 228, 328, 230, 329; 463/1, 40, 41, 42

(56) References Cited

U.S. PATENT DOCUMENTS

| | | | | |
|---|---|---|---|---|
| 5,138,712 A | * | 8/1992 | Corbin | 713/200 |
| 5,438,508 A | * | 8/1995 | Wyman | 705/8 |
| 5,629,980 A | * | 5/1997 | Stefik et al. | 705/54 |
| 5,638,443 A | * | 6/1997 | Stefik et al. | 705/54 |
| 5,715,403 A | * | 2/1998 | Stefik | 705/44 |
| 5,958,051 A | * | 9/1999 | Renaud et al. | 713/200 |
| 6,058,383 A | * | 5/2000 | Narasimhalu et al. | 705/44 |
| 6,134,659 A | * | 10/2000 | Sprong et al. | 713/190 |
| 6,188,995 B1 | * | 2/2001 | Garst et al. | 705/59 |
| 6,233,684 B1 | * | 5/2001 | Stefik et al. | 713/176 |

OTHER PUBLICATIONS

Lai et al, "Endorsements, Licensing, Insurance for Distributed System Services," Mar. 1995, pp. 1–12.*

"Microsoft incorporates new anti-piracy technologies in Windows 2000, Office 200: New Internet monitoring program also intended to protect consumers and honest resellers from mounting problems of software piracy", 2/2000, M2 Communications Ltd., dialog t.*

* cited by examiner

Primary Examiner—Gail Hayes
Assistant Examiner—Christopher A. Revak
(74) Attorney, Agent, or Firm—Workman, Nydegger, Seeley

(57) ABSTRACT

The present invention is directed to a novel system and method for regulating a network service provider's ability to provide network services to a distributed application executing on a network connected computer, which is dependent upon whether the NSP possesses a valid permit. The permit is a data structure created by a vendor or distributor of a distributed application. The vendor can selectively issue a permit to the NSP (or NSPs) for which authorization is being granted. When the distributed application is being executed at a client computer, and the services of a particular NSP are requested, an application running at the client first requests that the NSP provide the client with a valid permit. If the permit is valid and authentic, and the identity of the NSP is confirmed, then the application executing at the client will permit the distributed application to utilize the network services of the selected NSP.

21 Claims, 7 Drawing Sheets

SYSTEM AND METHOD FOR REGULATING A NETWORK SERVICE PROVIDER'S ABILITY TO HOST DISTRIBUTED APPLICATIONS IN A DISTRIBUTED PROCESSING ENVIRONMENT

BACKGROUND OF THE INVENTION

1. The Field of the Invention

The present invention relates to the utilization of network services by an application client. More particularly, the present invention is directed to a system and method for regulating the use of distributed applications in a manner so that the applications can only be used in connection with the network services of an authorized network service provider.

2. The Prior State of the Art

Historically, personal computer software applications provided a stand-alone, single-user type of operating environments. However, new computer technologies and software applications have continued to enhance the computers ability to gather, process and distribute information, giving rise to the need for the interconnection and sharing of data between computers. This has resulted in the connection of computers by way of a variety of techniques, including local area networks, wide area public networks (such as the Internet) wide area private networks, direct modem links, and commercial service providers such as Microsoft Network and America Online.

Such interconnection schemes were initially designed and implemented for purposes of facilitating the exchange of data and information between computer users, i.e., exchanging data files, sending and receiving of electronic mail, etc. However, the increased availability and capability of high speed networks has resulted in the development of far more sophisticated distributed network applications. Such network technologies allow for the transparent interoperation and communication between applications that run on respective client computers connected via a particular network, and allow computer users to dynamically interact and share application data with one another.

While such distributed applications can serve any one of a number of different functions, one timely example is computer gaming applications. With this type of distributed application, a user executes a distributed game application at a standalone computer (sometimes referred to as a client). The user will then initiate access to a particular communications network host (referred to herein as a Network Service Provider, or "NSP") such as may be provided by, for example, Microsoft Network, America Online, or a private gaming network, which in turn provides access to the network services for use by the distributed application. The application will then proceed to interoperate/communicate with other similarly connected computers running that particular distributed application, via the NSP network. For instance, game data and game state information is exchanged between the network connected computer participants via the network services provided by the NSP. In this way, each of the computer users/players can simultaneously compete and/or otherwise interact with one another in the manner defined by the particular distributed game application.

Currently, there are a variety of network service providers (sometimes referred to as Online Service Providers) that provide such network "host" services for these types of distributed applications. It will be appreciated that as the availability, usage, and popularity of these types of distributed applications expands, there is a corresponding increase in demand for the services provided by the NSPs—an obvious economic benefit to the NSP. It would be desirable for the application vendor to share in this benefit, since it is the application that is generating an increase in demand for NSP services. Similarly, it would be desirable for an NSP to negotiate with an application vendor to be the exclusive network service provider for a particular application. However, until now there has not been a suitable solution for arranging such an exclusive arrangement.

Instead, an end user typically need only purchase a copy of the distributed application (e.g., a computer game), and the user is then free to run it on any NSP network that supports the communication protocols utilized by that application. Since such applications typically support widely used, industry standard protocols such as TCP/IP, IPX, etc., the application user can often select from any one of a number of NSP's on which to utilize the application. As such, the application vendor has no practical way of limiting its application to a selected NSP.

Current approaches that have been used to restrict a distributed application's use to a specific NSP have not been entirely satisfactory or practical. One approach has been to preconfigure the application so that it is operable only in connection with a particular NSP. For instance, the application software itself will be customized to have a particular communications front end so that the application is only capable of running on the network services provided by a specific NSP. Use of the application is limited to that provider because the software is incompatible with the networks of other NSPs. While the approach allows for the desired exclusive arrangement between a vendor and an NSP, the approach is severely limited in flexibility, and therefore does not provide a practical business solution. For instance, in the event that the application vendor seeks to develop relationships with other NSPs, or seeks to subsequently develop an exclusive arrangement with a different NSP, the underlying software must be rewritten, reconfigured or otherwise manipulated so as to be capable of running via the new NSP's network. This of course would include a rewrite or reconfiguration of all existing applications—an impractical, time consuming and expensive process.

What is needed then is a method for regulating the use of a distributed application on preselected NSP(s) that is flexible enough so as to permit the application vendor to easily change to different authorized NSPs without requiring any customization or reconfiguration of the underlying application. Moreover, the method should ensure that when authorization is granted to one exclusive NSP, other non-authorized NSPs are prevented from providing unauthorized network services to that particular application. Preferably, the authorization scheme should easily transferable, so that authorization can be granted to one particular NSP for a certain amount of time, and then be granted to other NSPs after that prescribed time period has expired. Also, an authorization scheme should not be susceptible to counterfeiting or alteration. Allowing an application vendor this ability to selectively and safely provide authorization to a NSP will allow for exclusive and flexible business arrangements resulting in new, synergetic business models between NSP's and application vendors. For instance, application vendors will have access to a new revenue stream from NSPs who are interested in supporting the vendor's application. At the same time, NSPs will have an opportunity to add value and generate new demand for their services. For example, a NSP can be the exclusive host for a new, high demand premium application, and thereby gain new subscribers wishing to utilize that application.

BRIEF SUMMARY AND PRINCIPAL OBJECTS OF THE INVENTION

The foregoing problems in the prior state of the art have been successfully overcome by the present invention, which is directed to a system and method for regulating a network service provider's ability to host a particular distributed application. More particularly, the present invention defines a system and method whereby an application vendor is able to pre-define a service provider verification data set, or "permit," for a particular distributed application, such as a computer game application. The application vendor can then issue this "permit" to a selected NSP. The permit authorizes the NSP to provide network communication services to that particular distributed application. Further, use of the permit prevents other non-authorized NSPs from attempting to provide network services to that particular application.

The permit preferably contains at least one unique identifier that provides the ability to authenticate the validity of the permit, and that also provides the ability to confirm the integrity of the permit data when it is presented by the NSP. This provides assurance that the permit data has not been modified or replaced in transit, and also prevents the creation and/or use of counterfeit or improperly obtained permits. While other approaches could be used, in a preferred embodiment this unique identifier is in the form of a "digital signature" that is placed on the permit. This digital signature uniquely identifies the permit as having been issued by a particular application vendor, and can be used to ensure the integrity and the authenticity of the permit and its data content.

Preferably, the permit also contains additional parameters—or verification data—that define the scope of the authorization that is granted to the NSP. For instance, information regarding the particular application for which authorization is being granted would typically be included, such as a unique identifier of the application, the version/release number of the application, and/or information about the application vendor. Other authorization parameters can also be included. For example, a specified time period for which the authorization is being granted can be placed in the permit. In a presently preferred embodiment, the permit also includes the NSP's own "software publisher certificate," or "Public certificate," which can subsequently be used to validate that a NSP has presented a permit that actually belongs to that NSP. This prevents one NSP from utilizing and presenting another's permit.

In a preferred method of operation, when a distributed application is executed at a client computer, access to the network services of a particular NSP are requested. However, before the game application is permitted to utilize the services of the NSP, in one embodiment an interface software module executing on the client computer requests that the NSP provide it with a proper permit. If no permit is provided, the game application will not be allowed to access that particular NSP. If the client computer does receive a permit, the permit's authenticity and integrity, as well as the scope of the authority granted, is verified via the unique identifier, and via any verification data associated with the permit. If the permit is not valid for any reason, access to that NSP is denied. As noted above, the permit preferably includes verification data that enables the client, via the interface software module, to ensure that the NSP that presents the permit is actually the NSP for which the permit was originally created. This is accomplished in the preferred embodiment by verifying the authenticity of a public certificate contained within the permit and thereby verifying the identity of the NSP presenting the permit.

Under some circumstances, there may be a need for the application vendor to revoke authorization that has been previously granted to a particular NSP. Under this approach, a second confirmation of the NSP's "current" status is required. For instance, some event may have occurred since the time that the NSP was initially granted authority that prompts the application vendor to revoke that authority. To accomplish this, in an alternate embodiment when a distributed application is executed at a client and is connected to a previously authorized NSP, the interface module first forwards a unique request data packet to the application vendor via a communications link to the NSP. Upon receiving the data packet, the vendor determines whether the NSP should be allowed to provide services to the specified distributed application. If so, it will return a permit containing a unique identifier to the NSP, which then forwards it to the client. The client then verifies that the NSP remains authorized to provide the requested network services by way of the contents of the permit. If the permit is valid, communications on the NSP will proceed. If not, access to the NSP for the distributed application is denied. This approach allows the vendor to easily revoke authority from a NSP at any time.

Use of this generic permit to grant/revoke authorization allows an application vendor to easily regulate which NSP (or NSPs) will be permitted to supply network services for its distributed application. Authorization is dictated by NSP's possession of a valid permit. This greatly enhances a vendor's ability to form and change business relationships with service providers. Moreover, authorization can be granted without having to rewrite or change the application itself.

Preferably, functions relating to communications with the NSP, and to the validation and authentication of a permit received from the NSP, are handled by way of the interface software module executing at the client computer. Such functions are made available to the distributed application by the interface module by way of a common program interface (or application program interface—API). In this way, distributed applications need only be written to this defined API. This results in greater flexibility. For instance, in the event that an application vendor forms a new business relationship with a new NSP, the distributed application does not have to be changed or reconfigured, because it will continue to access the NSP network by way of the standard interface defined by the interface module API.

Accordingly, it is a primary object of the present invention to provide a system and method for enforcing a relationship between a network-based distributed application and a provider of network services so that the application will only work with pre-authorized network(s).

Another important object of the present invention is to provide a system and method that allows an application vendor to selectively authorize NSPs to provide network services to the vendor's application in a manner that does not require any customization or pre-configuration of the application.

An additional object of the present invention is to provide a system and method that allows an application vendor to revoke an NSP's ability to host an application.

Still another object of the present invention is to provide a system and method that allows an application vendor to designate new NSPs as being authorized to provide network services for a distributed application, without having to alter, update or otherwise customize the actual distributed application software.

Another object of the present invention is to provide a system and method that allows an application vendor to selectively authorize NSPs to provide network services to the vendor's application with an authorization scheme that cannot be falsified, reproduced, copied, counterfeited or changed and used by an unauthorized NSP.

Still another object of the present invention is to provide a system and method that verifies the identity of a NSP so as to ensure that a particular NSP that purports to have authorization to host a particular application is in fact the NSP that was originally authorized by the application vendor.

These and other objects, features and advantages of the present invention will be set forth in the description which follows, and in part will be more apparent from the detailed description of a preferred embodiment, and/or from the appended claims, or may be learned by actual practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention contemplates both systems and methods for regulating a network service provider's ASP) ability to host distributed applications in a distributed processing environment. By way of example and not limitation, the invention is described by making reference to figures illustrating the general computing environment in which the invention may be implemented, and to functional and flow diagrams that illustrate either the structure or processing flow of embodiments used to implement the system and method. The diagrams should not be construed as limiting of the present invention's scope, but as illustrating an example of a presently understood preferred embodiment of the invention.

Figure 1:
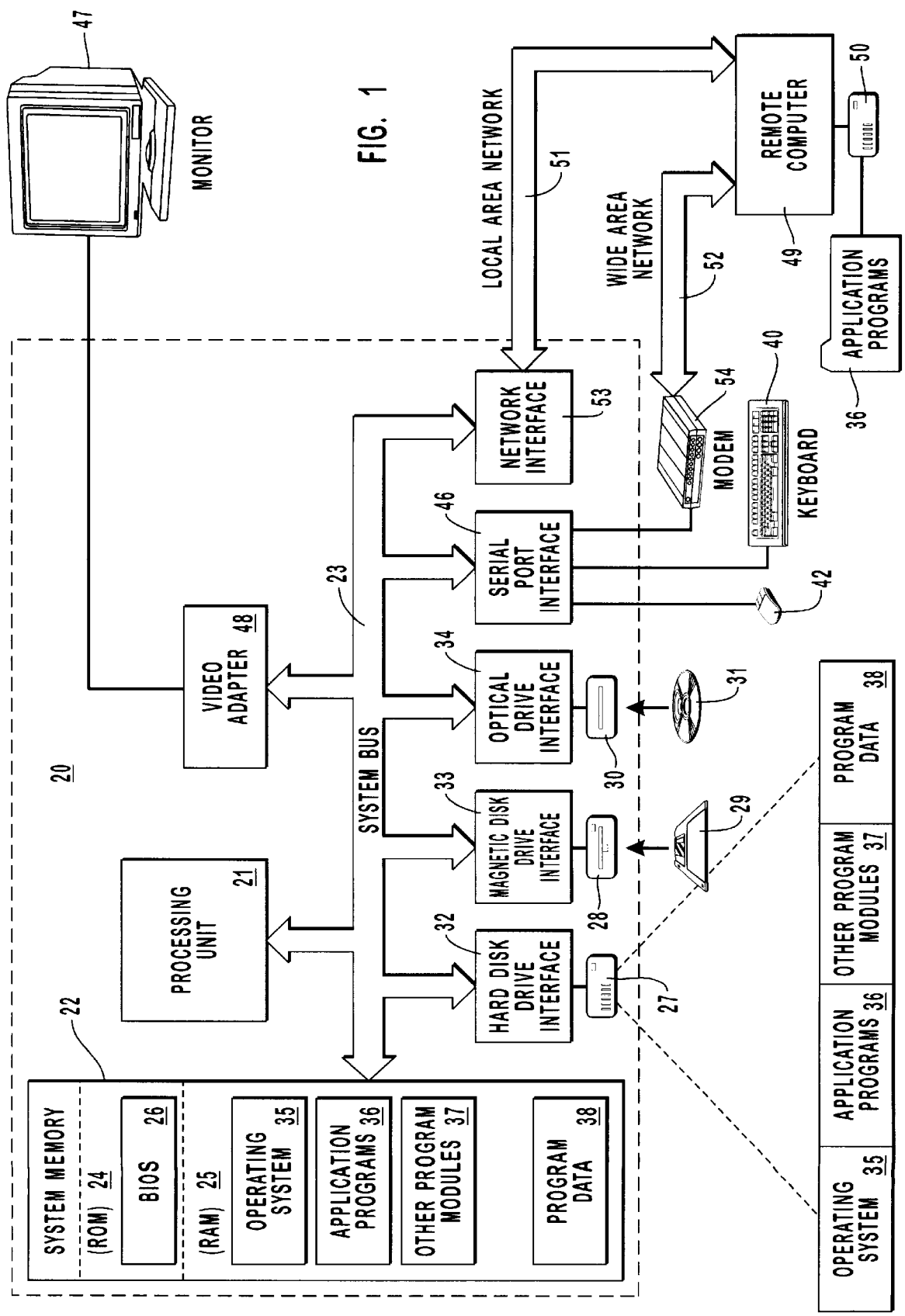
FIG. 1 is a functional block diagram illustrating one example of a suitable computing environment in which the present invention may be implemented.

FIG. 1 and the accompanying discussion are intended to provide a brief, general description of a suitable computing environment in which aspects of the invention may be implemented. Although not required, portions of the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. In preferred embodiments, the invention is practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, may be stored in ROM 24. The personal computer 20 may also include a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
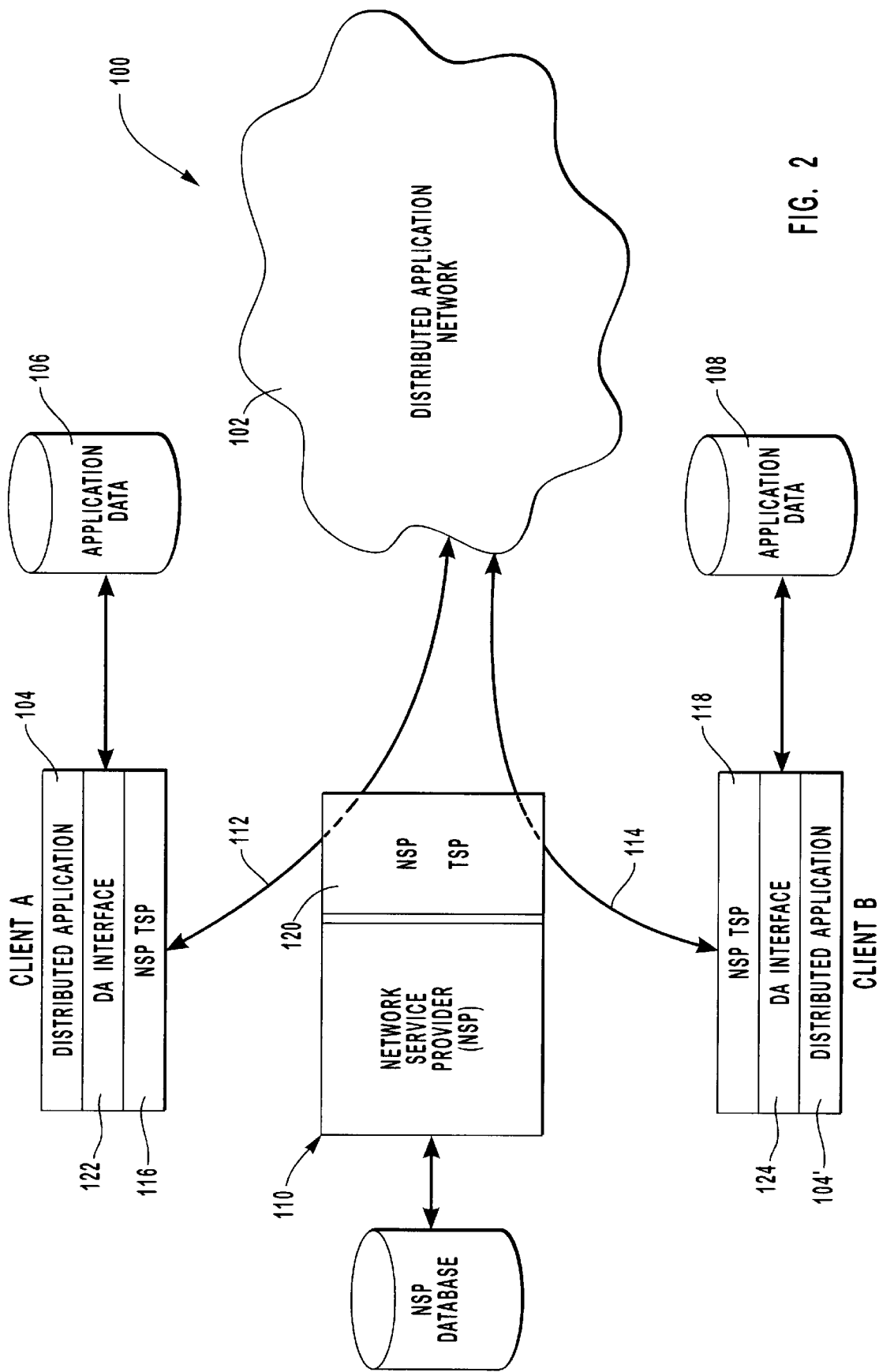
FIG. 2 is a system diagram illustrating one example of a generalized distributed processing environment of the present invention having network connected clients that are each participating in an application session.

Reference is next made to FIG. 2, which illustrates a functional block diagram of one embodiment of the overall operating environment of the present invention. While the invention could be used for any number of application clients, for purposes of illustration clients A and B are shown, each of which are interconnected by way of an arbitrary distributed application network 102, thereby forming a network based distributed processing system, designated generally at 100. The specific network implementation used for network 102 can be comprised of, for example, any type interconnection arrangement, including local area networks (LAN) and associated LAN topologies and protocols; simple point-to-point networks (such as direct modem-to-modem connections); and wide area network (WAN) implementations, including public internets (e.g., the Internet) and private commercial network services networks.

Each client A and B represents a particular distributed application, such as a multi-user distributed computer game, that is executing for instance on a general purpose personal computer of the type described above in connection with FIG. 1. The distributed applications are designated at 104 and 104'. Typically, the clients will each have access to some type of physical computer data storage, such as a disk storage medium, as is shown at 106 and 108 upon which is stored system and application files as well as corresponding data In a preferred embodiment, each client A and B accesses the distributed services of the application network 102 via a Network Service Provider (NSP), designated generally at 110. The NSP is typically a commercial network host, or online service provider, which provides network services to clients, such as access to the Internet, access to a private network, access to proprietary databases and services, etc. It will be appreciated that the physical NSP 110 can be implemented in a variety of ways. For instance, in the illustrated embodiment, the NSP is comprised of a conventional personal computer of the sort described above in connection with FIG. 1. One service provided by the NSP illustrated in FIG. 2 is to provide access to the distributed application network 102 for the distributed applications 104, 104' executing at each of clients A and B.

Clients A and B both access the NSP 110 (and the corresponding distributed application network 102) by way of access communications links represented schematically at 112 and 114. The communications links can be implemented by any applicable communications transport mechanism, including for instance a modem-to-modem telephone link, or a link which utilizes the Internet as the transport medium. In the illustrated embodiment, a NSP will provide a network services subscriber with an appropriate communications software module or driver, referred to herein as a Transport Service Provider, or TSP, that can be executed on the client computer. This TSP module is represented in FIG. 2 at block 116 for Client A, and 118 for Client B. A corresponding TSP module is also provided at the NSP, as is shown at 120. The TSP permits the client, and the distributed application, to access and utilize the distributed application network 102 provided by the NSP by providing the appropriate abstraction of the actual physical transport mechanism and protocols utilized by the particular network 102 that is being used. It will be appreciated that if a different NSP and network services are to be used, then a different TSP component from that particular NSP would be required.

Previously, in order for a distributed application to gain access to the NSP, the application itself would have to be customized so as to appropriately interact with the interface provided by the TSP (or similar) component at the client, or the application itself would have to be customized with the requisite communications capability, i.e., the TSP functionality would be incorporated within the distributed application itself. As discussed above, this approach is inflexible, especially in the event that the distributed application is to be used in connection with a different NSP provided network 102 that utilizes a different communications protocol. This would entail changing or updating the application code in a manner so as to permit communications via the new network services. This problem is addressed in the illustrated embodiment, wherein a defined application program interface (API) is provided, preferably by way of computer executable instructions that execute as a software application module at the client. For purposes of convenience, this software application/module is referred to herein as the "distributed application interface," or DA interface, which is shown functionally at 122 (Client A) and 124 (Client B). As is shown, the DA interface module 122, 124 functionally and logically resides between the distributed application 104, 104' and the corresponding TSP component 116, 118. The DA interface 122, 124 provides access to the TSP communication services which are made available to the distributed application 104, 104' by way of the defined application program interface (API). The DA interface module 122, 124 could be implemented as a separate software program or could be included as one functional component within a separate software application, such as Microsoft's DirectPlay application. Instead of implementing the functionality and the program interface of the DA interface in a separate software module, the DA interface could alternatively be implemented entirely within the distributed application itself.

In use, when a distributed application, such as a game, is invoked at the client by a user, the application 104, 104' (or the user) first initializes the DA interface module 122, 124 by specifying the particular NSP to use. Typically, this would occur with the user first establishing a physical communication link 112, 114 with a particular NSP. This could be accomplished through a network adapter on a LAN, a serial link or direct communication link through a modem, or through a Wide Area Network such as the Internet. Upon establishing a physical communication link to the NSP 110, the distributed application can then communicate via the network services provided by the NSP's distributed application network 102. Access to this network 102 is gained via the API provided by the DA interface 122, 124 which in turn selects the appropriate TSP component, which is selected based on the particular NSP network 102 to be used. The DA interface module 122, 124 module will then interact with the TSP 116, 118 in the appropriate manner so as to permit the application 104, 104' to access the network services of the NSP. In the illustrated embodiment, the distributed application 104, 104' only interacts with the API provided by the DA interface 122, 124, which in turn utilizes the appropriate TSP to appropriately communicate over the network 102. In this way, distributed applications can be written to the API that is defined by the DA interface module, and are thus insulated from the communication programming requirements of different NSP's and associated TSP's. Additional advantages will become more apparent in the following discussion.

Figure 4:
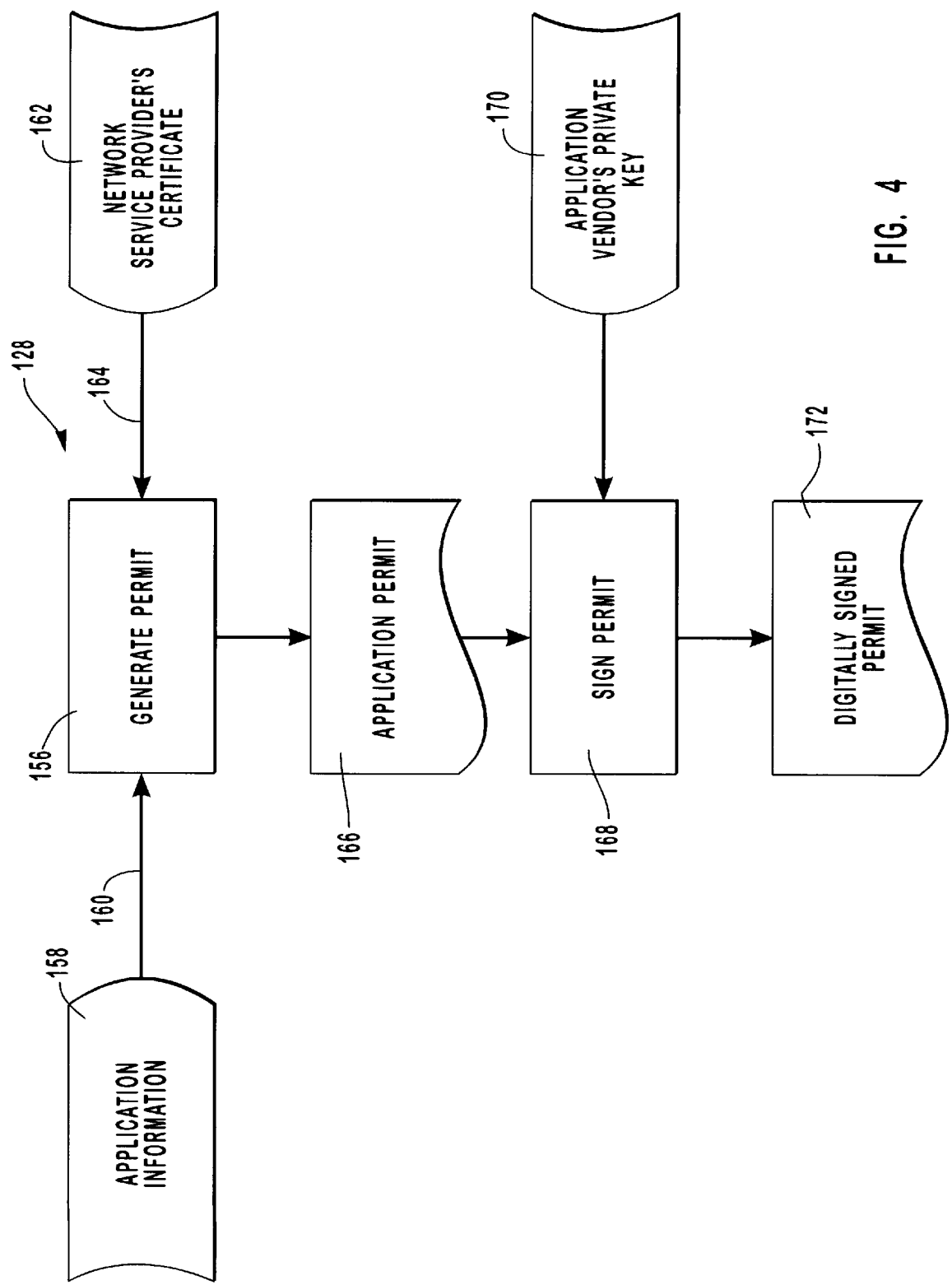
FIG. 4 illustrates a flow chart diagram illustrating one example of the program steps that can be used by an application vendor to create a permit for issuance to an NSP.
Figure 5:
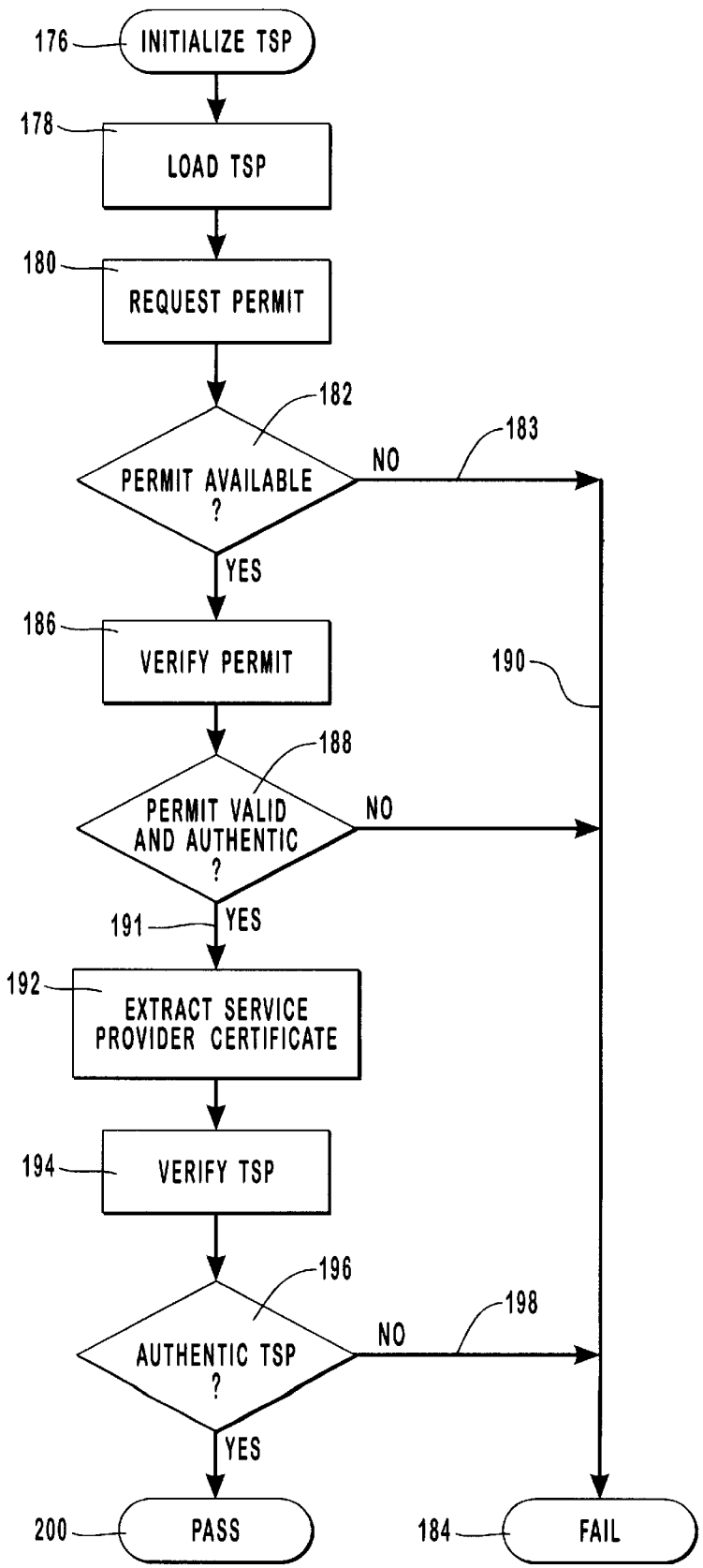
FIG. 5 illustrates a flow chart diagram illustrating one example of the program steps that can be used by an application client when checking whether an NSP is authorized to provide services for a particular distributed application.

Before a distributed application is permitted to communicate via the network services of a NSP, it must first be determined that the selected NSP has been appropriately authorized to provide services for the requesting distributed application. By way of example and not limitation, an embodiment illustrating this particular aspect of the invention is shown in FIGS. 3–5, to which reference is now made.

Figure 3:
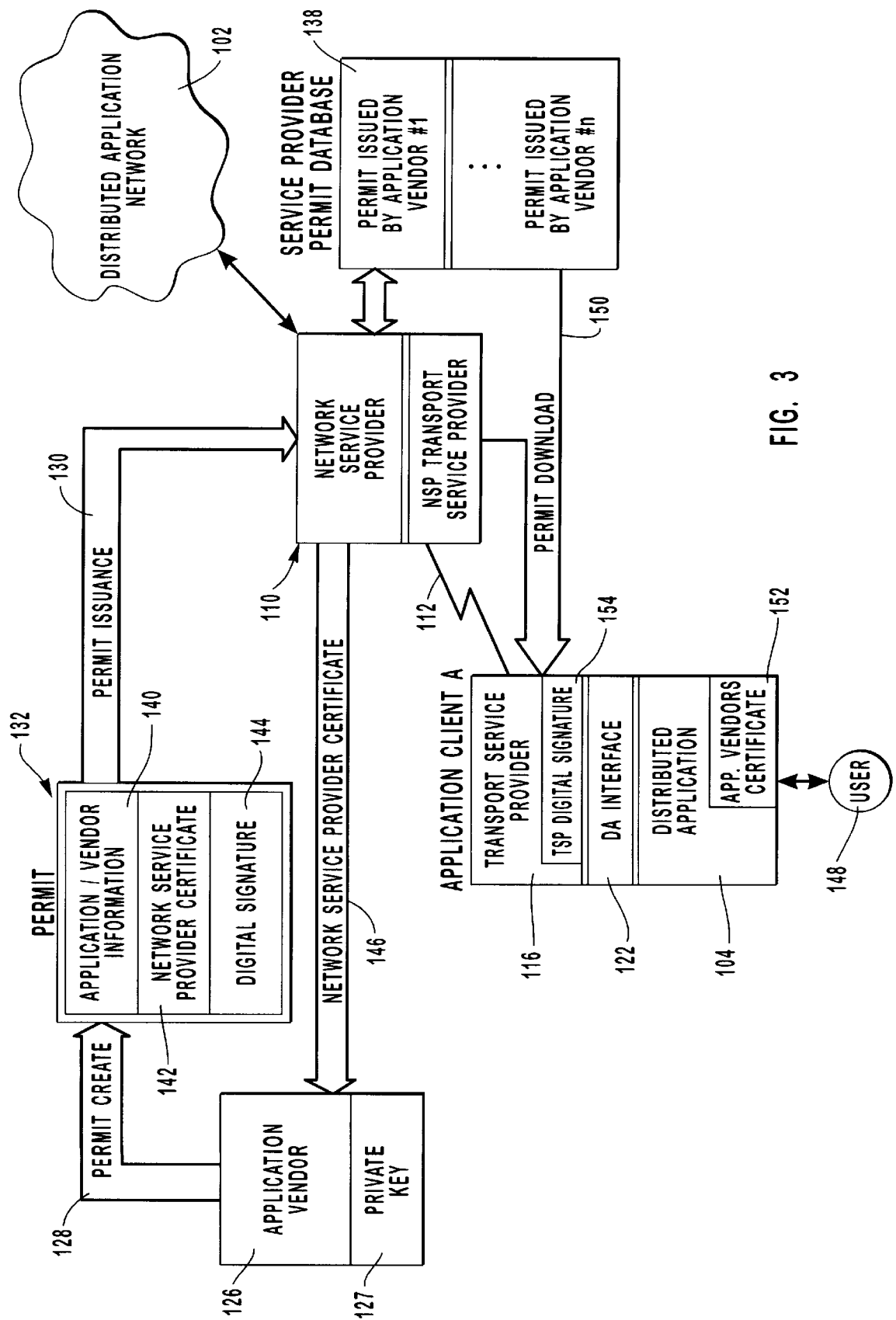
FIG. 3 is a system diagram illustrating generally the overall system of the present invention and the process flow associated with creation, issuance and download of a permit between an application vendor, a NSP and an application client.

FIG. 3 illustrates the functional blocks corresponding to the overall system and process flow that can be used to provide the creator/vendor of a distributed application with the ability to regulate the use of its applications on a particular NSP network. For purposes of convenience, FIG. 3 illustrates a single application client, Client A from FIG. 2, executing a distributed application 104 that requires the services of a particular distributed application network 102 provided by NSP 110. Before network services can be provided for the application 104, the NSP 110 must be authorized by the vendor of that application 104. Only if proper authorization has been granted will the application 104 be permitted to utilize the services of the NSP 110.

In the embodiment illustrated in FIG. 3, this authorization is granted by the application vendor, designated in FIG. 3 at block 126, by way of a verification data structure, or "permit," one presently preferred example of which is designated generally at 132. Possession of a valid permit by a NSP will allow the NSP to provide network services for a corresponding distributed application. Preferably, the permit is created and issued to a particular NSP by the application vendor, which can be any entity that develops and/or distributes a particular distributed application; the entity could be either a company or an individual. As is indicated by schematic flow line 128, the permit 132 is electronically created by the application vendor 126 for a particular application 104. Once created, the permit can be issued to the selected NSP 110, as is shown schematically at 130. The permit 132, which will be described in further detail below in connection with FIG. 4, preferably contains some type of verification data that can be used to determine whether a NSP is in fact authorized to provide network services to a particular application. For example, the verification data could include information regarding the application 104 and the vendor 140; a NSP public certificate 142 provided by the NSP 110, as is shown via schematic flow line 146; and/or information that can be used to verify the integrity and the authenticity of the permit 132. While other approaches could be used, in the preferred embodiment the integrity and the authenticity of the permit 132 can be verified by way of a unique digital signature 144 that is placed within the permit 132 data structure. As will be described in further detail, the digital signature 144 is created by using public key cryptography techniques by utilizing a private key 127 owned by the application vendor. The authenticity of the digital signature 144 is then verified with the application vendor's corresponding public key contained within the vendor's public certificate 152, which in the illustrated embodiment is appended to the distributed application 104. In addition, the digital signature 144 can be created in a manner such that the integrity of the data contained within the permit 132 can be assured. In this way, the permit can be uniquely defined so as to provide assurance that the permit, and the data contained therein, has not been changed or modified while enroute to its intended NSP destination, and that the permit 132 is an original and not a counterfeit.

Once a permit 132 for an application 104 has been created by the application vendor 126, it is issued in suitable manner to a selected NSP 110, as is shown via schematic flow line 130. Preferably, the permit 132 is issued to the NSP 110 electronically, such as by way of electronic mail or similar electronic exchange. In the illustrated embodiment, the NSP 110 then stores the permit 132 in an appropriate fashion, such as in a service provider permit database 138 portion of computer storage available to the NSP 110 host computer. However, it will be appreciated that instead of physically storing the permit, the NSP 110 could obtain it electronically from the vendor 126 via an appropriate communications link every time that a permit is requested by a client. Possession of the permit 132 by the NSP 110 serves as proof that the NSP 110 has been authorized to provide network services for the particular application 104. If the NSP 110 has been authorized to provide network services for other applications, either for that vendor 126, or for other vendors, then corresponding permits would also be electronically issued and optionally stored in database 138.

With continued reference to FIG. 3, when a user 148 wishes to invoke a distributed application 104 at the client A and then launch the application on network 102, the user first establishes a physical communication link 112 to the desired NSP 110, such as by way of a modem-to-modem link. Once the communications link is established, the application 104 can then communicate over the NSP's 110 network 102. As was described above, this communication is facilitated by selecting and loading the appropriate TSP communications module 116 that has been previously supplied by that particular NSP 110. However, before the application 104 is permitted to utilize the network services of network 102 and communicate with other like-connected applications in a distributed fashion, the NSP 110 must first prove that it has the authority to provide such services to the application 104. To do so, the NSP 110 retrieves the appropriate permit 132 and electronically forwards it to the application client A via communications link 112, as is represented by the schematic flow line at 150.

Once the permit 132 has been received at the application client A, its contents are checked to establish the validity and authenticity of the permit, and to ensure that the permit authorizes the NSP 110 to provide services for the particular distributed application 104 that is seeking access to network 102. For example, the verification data can be evaluated so as to determine whether the permit 132 has expired and whether it was issued for the particular version of the distributed application 104. In addition, in a preferred embodiment the integrity and the authenticity of the permit 132 is verified. Again, this assures that the permit 132 was not tampered with enroute, and that it was actually created by the application vendor 126. Optionally, the permit can be used to verify if the NSP 110 that has provided the permit 132 is actually the NSP for which the permit 132 was originally created. In the illustrated embodiment this verification is accomplished by checking and verifying the identity and authenticity of the software TSP module 116 to ensure that it was created by the same NSP to which the permit 132 was originally issued. Only if the permit 132 is deemed valid and presented by the proper NSP, can the application 104 be launched on the NSP's 110 network 102.

Reference is next made to FIG. 4, which is a flow chart illustrating in further detail one example of the presently preferred process steps for creating the permit 132. Preferably, the permit 132 is created by the application vendor 126 by utilizing a general purpose personal computer of the type described above in connection with FIG. 1. Thus, the process steps illustrated in FIG. 4 could be implemented by way of computer-executable instructions stored on an appropriate computer readable medium. Again, the instructions could be implemented as a separate stand-alone software application, or could be included as a separate functional component within a separate software program, such as Microsoft's DirectPlay application.

Beginning at program step 156 in FIG. 4, the executable instructions corresponding to the creation of the permit 132 (FIG. 3) are executed by the computer cpu (not shown). This step 156 generally corresponds to the creation and/or receipt of the desired verification data that will be included in the permit 132 data structure. For instance, the verification data can include parameters that are relevant to the identification of the particular application for which the permit 132 is being created, and may also include information that is relevant to the scope or extent of the authority being granted to the NSP 110. Such information is represented at program step 158, which can be input 160 either manually, such as from a computer keyboard, or automatically retrieved from computer storage. By way of example and not limitation, in a preferred embodiment the following information is retrieved at program step 158 and used to generate this aspect of the permit at program step 156:

(1) a unique application identifier, or application GUID (Globally Unique Identifier), which identifies the distributed application for which authorization is being granted via the permit;

(2) the version information for the application, which identifies the software version(s) of the application for which authorization is being granted;

(3) the issue date of the permit, which signifies the effective date of the permit;

(4) the expiration date of the permit, which signifies the date upon which the permit is set to expire; and (5) vendor information, which serves to identify the particular application vendor that is creating the permit.

In addition to the inclusion of such application related information, in a preferred embodiment the permit is generated at step 156 so as to also include verification data that can later be used to verify that the NSP that downloads and presents the permit is actually the NSP to which the permit was originally issued. This ensures that a NSP does not attempt to use a permit that it was not officially issued (i.e., the permit was issued to a different NSP).

In the exemplary embodiment of FIG. 4, this NSP authentication information is submitted at program step 162 in the form of a "public certificate" that is owned by the NSP 110 and provided to the application vendor 126, as is schematically shown at 164 in FIG. 4. This certificate (designated at 142 in FIG. 3) is then appended to the permit at program step 156. The certificate, sometimes referred to as a "digital certificate" or a "public key certificate," is an electronic data record that identifies an entity (such as the NSP, for example), and also serves to verify that a specific public key (for decryption) and private key (for encryption) belongs to that particular entity. Typically a certificate is issued to an entity by a Certification Authority (CA) only after that Authority has verified that the specified keys belong to that entity. In the preferred embodiment, this certificate is then provided to the application vendor 126 so that the NSP's 110 public key can be included within the permit 132 at program step 156. As will be discussed in further detail below, it is this public key that is later used to confirm that the NSP that provides a permit 132 is indeed the NSP to which the permit was issued.

Once this verification data has been used to generate the permit 132, the cpu of the application vendor 126 computer next proceeds to the set of executable instructions corresponding to program step 166. This step provides the function of outputting an appropriately formatted data structure used for the permit 132, which has the above-described content. The precise data structure used for the permit can be any appropriate format. Preferably, the format used is one that allows the permit to be optimally and efficiently stored and distributed.

In a preferred embodiment, additional information can be added to the permit that further serves to ensure later verification of the permit. This is shown beginning at program step 168, which corresponds to the executable instructions that provide the function of providing a permit 132 with a unique identifier. In addition to uniquely identifying the permit 132, the unique identifier also preferably serves to insure the integrity of the data contained within the permit 132. While other approaches could be used to provide this function, including various encryption techniques, in the preferred embodiment a "digital signature" is used, which is generally the electronic equivalent of a written signature on a piece of paper. Thus, at program step 168 the application vendor 126 applies its own digital signature (shown at 144 in FIG. 3) to the permit 132.

In the preferred embodiment, the application of the digital signature 144 is accomplished using public key cryptography using a technique that is typically referred to as a public-key (asymmetric) algorithm or a asymmetric cryptosystem, a common example of which is the well known RSA Public-Key Cipher. This sort of algorithm uses two different keys for the generation and validation of a digital signature: the public key and a corresponding private key. These are two different but mathematically related keys; one for creating a digital signature (the private key), and another for verifying a digital signature (the public key). As its name implies, the private key is kept private to the owner of the key pair, and the public key can be distributed to those who need to verify the digital signature.

To verify a digital signature, the verifier must have access to the signer's public key and, preferably, have some assurance that it corresponds to the signer's private key. This assurance can be provided through the use of one or more trusted third parties to associate an identified signer with a specific public key. As discussed above, that trusted third party is often referred to as a Certification Authority (CA). To associate a key pair with a prospective signer, the CA issues a certificate, which is essentially an electronic record that includes a public key and which confirms that the prospective signer identified in the certificate holds the corresponding private key. Thus, a certificate's principal function is to bind a key pair with a particular signer. A recipient of the certificate desiring to rely upon a digital signature created by the signer named in the certificate can then use the public key listed in the certificate to verify that the digital signature was created with the corresponding private key. If such verification is successful, this chain of reasoning provides assurance that the corresponding private key is held by the entity (i.e., the signer) named in the certificate, and that the digital signature was created by that particular entity.

To make a public key and its identification with a specific subscriber readily available for use in verification, the certificate may be published in an accessible on-line repository or made available by other means. In the preferred embodiment, the application vendor 126 distributes its certificate (and corresponding public key) by embedding it in its distributed application 104. This embedded certificate is illustrated in FIG. 3 at element 152.

With reference again to the flow chart of FIG. 4, in the illustrated embodiment the application vendor 126 applies a digital signature to the permit at program step 168. To do so, the vendor 126 utilizes its private key (represented at 127 in FIG. 3), that it has preferably acquired along with a corresponding public key from a Certification Authority. Alternatively, a vendor could generate a public and private key pair locally utilizing readily available software tools such as Microsoft Corporation's Authenticode technology, which are then certified as being owned by the vendor by the Certification Authority. The private key is then applied, as is shown at program step 170, to the sign permit step 168. Step 168 corresponds to the series of executable instructions that actually generate the digital signature (shown at 144 in FIG. 3) that will ultimately be attached to the permit 132.

By way of example and not limitation, the generation of the digital signature 144 is accomplished with a standard public-key signature algorithm. Typically, this involves running the permit data that is output at program step 166 through a one-way "hash" function, which results in a fixed-length "digest" that is unique to the permit. The particular hash algorithm utilized can be any one of several well-known and well-studied cryptographic hash algorithms, sometimes referred to as "digest algorithms." The digest is then encrypted with the vendor's private key received at step 170, and the result is combined into the digital signature, which is unique to both the permit data and the private key used to create it. Thus, the digital signature is nothing more than the encryption of the permit's hash. In the preferred embodiment, this encryption algorithm is somewhat unique in that the key used to encrypt the permit (private key) is different from the key later used to decrypt it (public key). Importantly, knowledge of one key does not help determine what the other is. Once computed, this digital signature (144 in FIG. 3) is then attached to the permit and, as is shown a program step 172, the permit 132 is now ready to be distributed to the appropriate NSP 110. The algorithm for generating the digital signature can be implemented by way of executable instructions that are included as part of the overall program used to implement the program steps illustrated in FIG. 4. Alternatively, the function can be provided by way of a separate software application or utility that provides this particular function. For instance, Microsoft's ActiveX Development kit includes utilities for generating a digital signature.

Reference is next made to FIG. 5, which is a flow chart illustrating an example of the presently preferred process steps used to implement the executable instructions used in connection with the DA interface software module, shown at 122 in FIG. 3, that is executing on the cpu (not shown) of the application client (Client A in FIG. 3). The illustrated process steps correspond to the function that occurs once the user 148 has invoked the particular distributed application 104, and established a physical communication with the NSP 110 via a suitable communications link 112, such as by a direct modem-to-modem link. The distributed application 104 will then request, via for instance appropriate calls to the API defined by the DA interface module 122, that the application 104 be launched on the Distributed Application Network 102 provided by the accessed NSP 110. This is done by requesting that the appropriate TSP module/driver 116 be loaded by the DA interface 122, so that the distributed application 104 can proceed to communicate on the distributed application network 102. However, before access to the network 102 is permitted, it must first be determined whether the requested NSP has authority to provide such services. In the example embodiment, this function is accomplished by the DA interface module 122.

Beginning at program step 176 a series of executable instructions are performed by the computer cpu that initialize the DA interface module 122 so as to allow it to perform the necessary checks on the NSP's authority to service the particular distributed application 104. At program step 176, the appropriate TSP module that must be initialized so as to permit communication over the particular NSP 110 provided network 102 is identified. In addition, application information is requested from the distributed application 104, which is in turn provided by the application 104 via the API defined by the DA interface 122. This information may include, for example, the application's GUID (globally unique identifier), the application's version number, and information regarding the application's vendor, and/or any other type of information that may be needed to verify the downloaded permit. In addition, in the preferred embodiment the DA interface module 122 also receives from the application 104 the application vendor's certificate 152, which contains the vendor's 126 public key.

Next the executable instructions corresponding with program step 178 are executed. Here, the particular TSP 116 identified in the prior step is loaded for execution. Again, the TSP module 116 provides the requisite communications interface for communicating via the selected distributed application network 102. The TSP module 116 interfaces directly with the DA interface module 122, and the distributed application 104 can then communicate over the network 102 via the DA interface 122 and its defined API. In this way, the application 104 does not have to be written so as to be compatible with any one particular TSP module. Instead, applications need only be written to the single API defined by the DA interface module 122, which in turn appropriately interacts with selected TSP. This eliminates any need to rewrite or customize an application in the event that it is used in connection with a different TSP.

Once the appropriate TSP module is identified and loaded, and prior to allowing the application 104 to be launched on the network 102, the client cpu next executes those instructions corresponding with the program step 180. At that step, the DA interface module 122 requests that the TSP communications module 116 send a message to the NSP 110 via the communications link 112. That message requests that the NSP 110 provide a permit for the specified distributed application 104.

Once the permit request is submitted to the NSP 110, executable instructions corresponding with program step 182 are executed. That portion of the code merely waits for receipt of a permit. If a permit is not provided within a prescribed period of time, then the client cpu proceeds, as is shown at line 183, directly to program step 184. At this step, it is concluded that this particular NSP is not authorized to provide services for the particular application 104, and the NSP is not permitted to host the distributed application 104. Optionally, the user can be informed of this situation by way of a descriptive message displayed on the client computer's display screen.

If however a permit is received at program step 182, the cpu instead proceeds to execute those instructions corresponding with the program step illustrated at block 186. At this program step, the received permit is verified to determine whether it is valid and does in fact authorize the NSP to provide network services for the specified distributed application 104.

While a single verification step could be used, in a preferred embodiment the permit is verified in two ways. First, the integrity and authenticity of the permit is verified to ensure that the permit and its data has not been tampered with since it was generated by the application vendor 126 and to ensure that the permit was actually created by the vendor of the distributed application 104 (i.e., it is not a counterfeit). Second, the permit is checked to determine if it has been issued for the application 104 in question, and not for a different application.

The validity of the permit 132 is first checked in the preferred embodiment by checking the integrity and authenticity of the permit 132. This is accomplished by verifying the digital signature 144 contained within the permit 132. To do so, the permit 132 is run through a one-way hash function in the same manner as was done by the application vendor 126 when the permit was digitally signed (program step 166 in FIG. 4). Then, the application vendor's public key, which is obtained from the certificate 152 contained within the application 104, is utilized to decrypt the digital signature 144. This results in a second hash. The two hashes are then compared and, if they match, the contents of the permit 132 are in the same state as when the permit 132 was first signed by the application vendor 126. Moreover, a comparison assures that the permit 132 was in fact signed by the entity that possesses the private key 127 that corresponds to the public key 152 used to decrypt the hash. If however the two hashes to not match, then the integrity of the permit 132 has been breached and/or it is not an authentic permit, and it is not deemed valid.

To determine if the permit is valid for the specified application 104, the various verification data stored in the permit (140 in FIG. 3) is extracted and compared with the corresponding application information obtained from the application 104 during the initialization program step 176. For example, the application GUID stored in the permit 132 can be compared with the GUID obtained from the application 104. Also, the application version contained in the permit 132 can be compared with the particular version of the application 104. In addition, the expiration date within the permit 132 can be examined to determine if the permit has expired. If other criteria are contained within the permit, then other validation checks could also be performed.

Having conducted the various tests relevant to the determination of whether the permit 132 received from NSP 110 is valid and intended for the specific application, the client computer cpu next executes those series of executable instructions corresponding to the program step shown at block 188 in FIG. 5. Here, if it was determined that the received permit 132 was not valid for any reason, then the cpu proceeds directly, as is represented by schematic line 190, to program step 184. Again, at this step the NSP is deemed to not have authorization to provide services for the particular application 104.

If the permit 132 was deemed to be valid, then the application could be allowed to be launched as the network 102. However, in a preferred embodiment, one additional check is performed. In this embodiment the cpu proceeds as is shown schematically by line 191 to a set of executable instructions beginning at program step 192. These instructions function so as to verify the identity of the bearer of the permit 132—the NSP. This ensures that the client is actually communicating with the NSP for which the permit was actually created, thereby preventing, for instance, a NSP from presenting a permit that had actually been originally created for a different NSP.

By way of example and not limitation, this process of verifying the identity of the NSP is accomplished by determining whether the TSP module running at the client (116 in FIG. 3) was actually created by the NSP 110 to which the permit 132 was originally issued. As noted above, the TSP module is typically a communications software program that is written by the NSP, and then provided to its subscribers. The module enables the subscriber to communicate with and access the NSP's services.

When created, the NSP can signify the authenticity of the TSP module by appending to the module 116 the NSP's own digital signature (154 in FIG. 3). Preferably, this is accomplished by using the NSP's private key and the same sort of private/public key signature algorithm discussed above. To determine whether the TSP module 116 was actually created by the NSP of interest, the cpu proceeds to those executable instructions shown at program step 192 in FIG. 5. These instructions provide the function of extracting the NSP's 110 certificate 142 that was included in the verification data of the permit 132 at the time of its creation (described above in connection with FIG. 4). Embedded within the certificate is the NSP's public key, which is also extracted.

Once the certificate 142 and its corresponding public key is extracted from the permit, the cpu proceeds to those executable instructions that correspond with program step 194. Here, the authenticity of the TSP module 116 is verified. In the preferred embodiment this is done by utilizing the NSP's public key to verify the authenticity and integrity of the digital signature 154 contained within the TSP 116. Again, the particular algorithm used to verify the signature is preferably the same as that used to verify the permit 132, previously described.

If at program step 196 the digital signature 154 appended to the TSP 116 is valid—thereby signifying that the TSP 116 was actually created by the NSP to which the permit was originally issued—the cpu allows the distributed application to be launched on the distributed application network 102 via NSP 110, as is indicated at program step 200. In this situation, the distributed application 104 proceeds to function in its intended manner as a distributed application operating across the distributed application network 102. If however the digital signature 154 is not valid, the TSP 116 is deemed to not be authentic and it is assumed that the NSP that has presented the permit is not the NSP for which the permit was originally created for and issued. As such, access to the NSP 110 network 102 is denied, and the cpu proceeds directly to program step 184, and access to the NSP's network 102 is denied. Again, a suitable error message can be presented on the client computer's display so as to inform the user 148 as to the nature of the failed operation—that the NSP is not authorized to provide services to the particular distributed application.

In the preferred embodiment described above, once a NSP has been granted authorization to host a distributed application via a valid permit, that authorization is continuing until such time that the permit expires, if applicable. However, under some circumstances it may be desirable for an application vendor to have the ability to at any time revoke an authorization previously granted. An example embodiment for providing this capability is shown in FIGS. 6 and 7, to which reference is now made.

Figure 6:
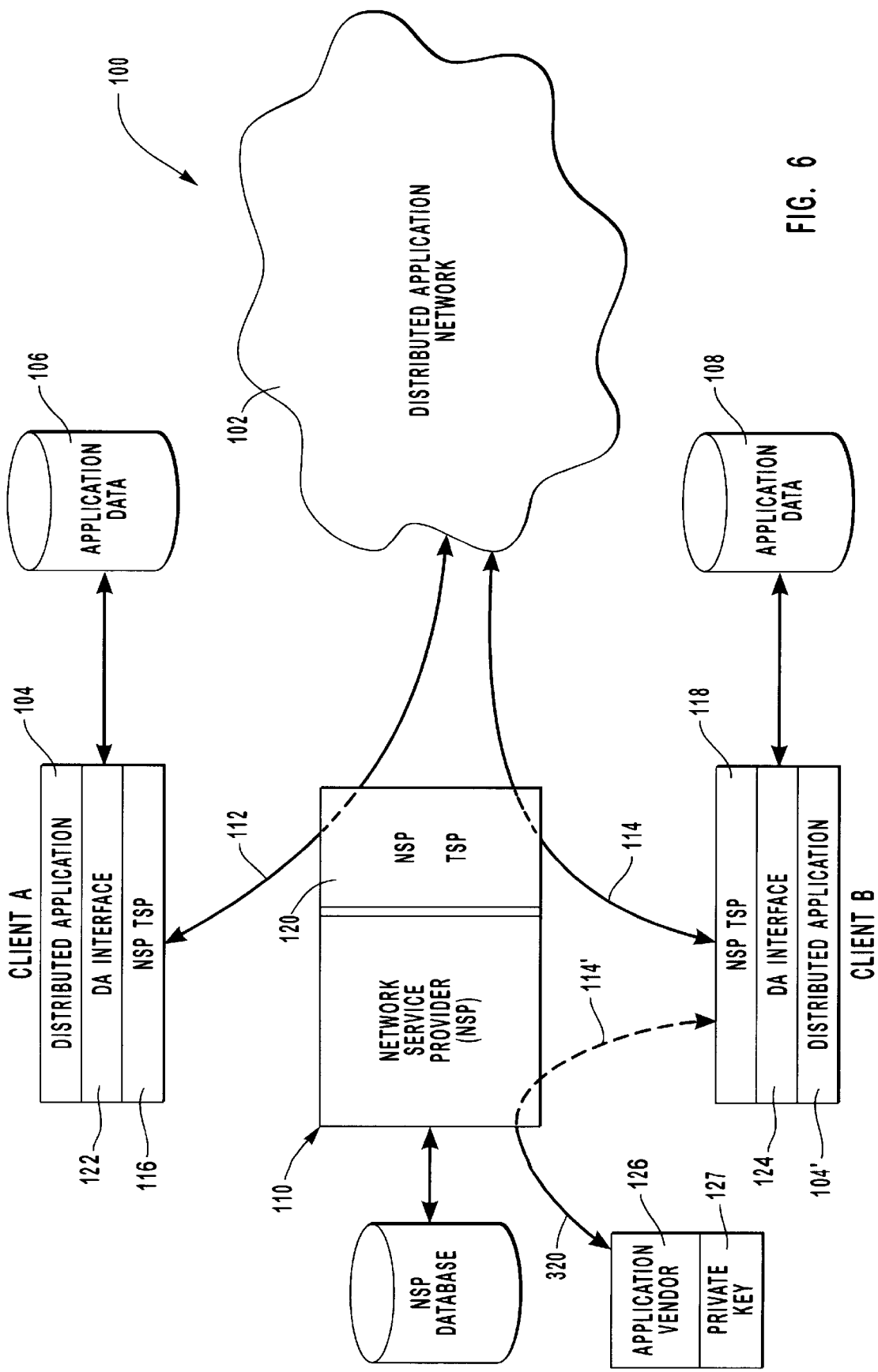
FIG. 6 is a system diagram illustrating one example of an alternative embodiment of a generalized distributed processing environment of the present invention having network connected clients that are each participating in an application session.

FIG. 6 is similar to the embodiment shown in FIG. 2, and like elements are designated with identical reference numerals. However, in the alternative embodiment shown in FIG. 6, each client, in addition to be remotely connected to the NSP 110, is also connected to the application vendor 126 of the invoked distributed application 104. For ease of reference, this connection is shown in FIG. 6 at Client B, which is remotely connected to the application vendor 126 by way of an appropriate communications link 320. Communications link 320 could be implemented via a private or public network (such as the Internet), or could be via a dedicated, modem-to-modem line connection. In operation, every time a distributed application 104' is executed at a client and is launched on a particular NSP 110, the application requests unique proof from the application vendor 126 that the NSP 110 is still authorized to provide the requested services. Since this sequence occurs each time that the distributed application 104' is executed on a particular NSP 110, then the application vendor 126 can revoke a NSP's authority to provide services at any time.

Figure 7:
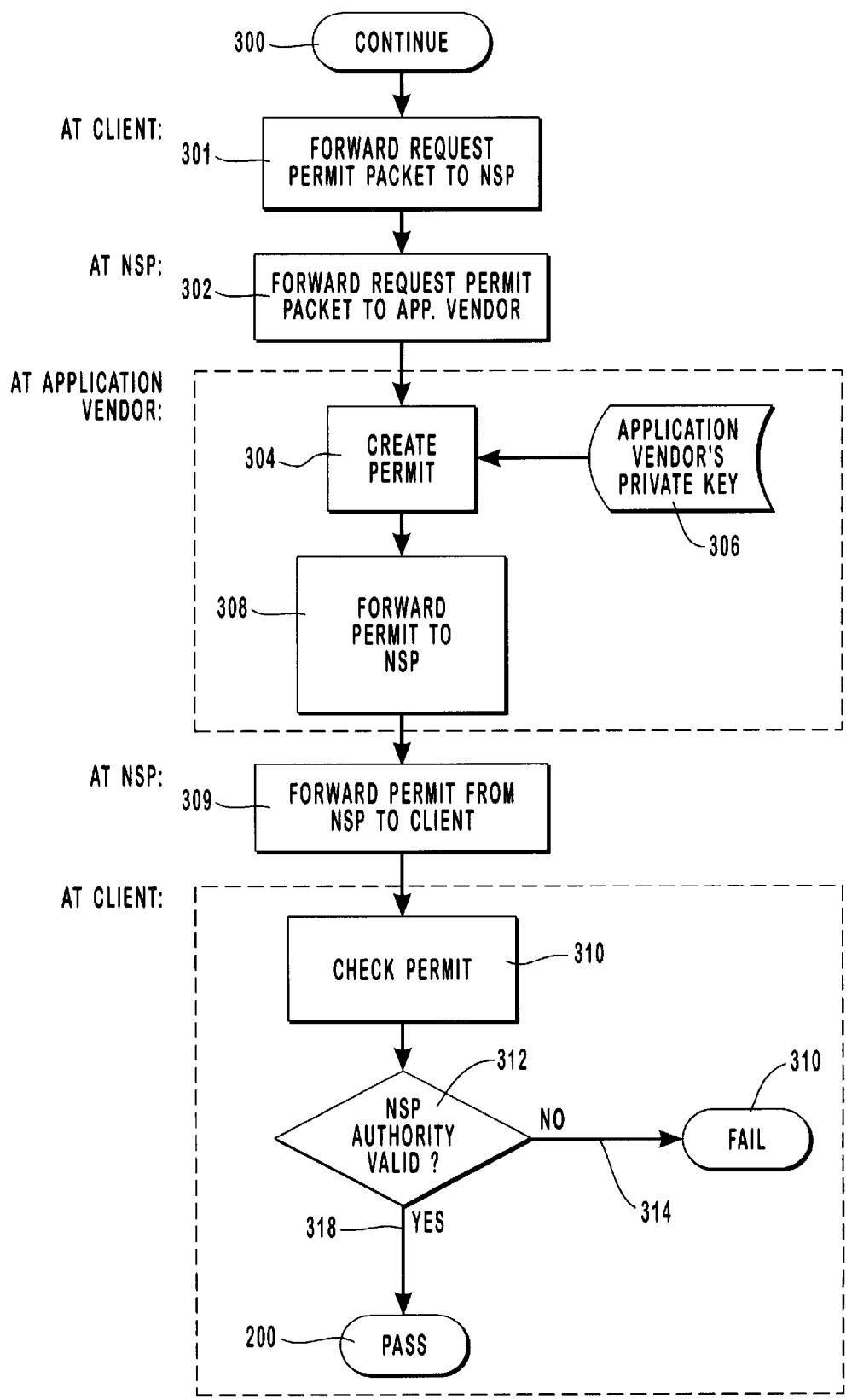
FIG. 7 illustrates a flow chart diagram illustrating an alternative embodiment of the program steps that can be used by the overall system to determine whether an NSP is authorized to provide services for a particular distributed application.

Reference is next made to FIG. 7, which is a flow chart illustrating one presently preferred example of the program steps that would be used to implement this particular embodiment. It will be appreciated that this particular approach for obtaining "real time" proof that a NSP is authorized to provide network services could be implemented with various approaches. Moreover, the scheme could be utilized in addition to approach described above in connection with FIGS. 2–5, i.e., a "primary" permit could be first be requested from the NSP to confirm its authority, and then a secondary "real time" permit could be requested to confirm that the NSP's authority has not been revoked since the issuance of the primary permit. Alternatively, the approach outlined in FIG. 7 could be used as an alternative scheme for confirming that a particular NSP is authorized to provide services for a specified distributed application, ie., the "real time" permit is the only permit utilized to evaluate a NSP's authorization.

The program steps illustrated in FIG. 7 begin as indicated at step 300. In the preferred embodiment, the method is used in connection with the authorization scheme described above, and step 300 would be invoked at an appropriate point within the program sequence shown in FIG. 5. For instance step 300 could be invoked just prior to program step 200 in FIG. 5, where the primary permit has already been confirmed. In the alternative if the approach set forth in FIG. 7 were to be used as the sole authorization scheme, then step 300 would correspond to the initialize functions provided in FIG. 5: the Initialize TSP and Load TSP steps shown at 176 and 178.

Program step 301 corresponds to the executable instructions that would be performed at the client computer (Client B in FIG. 6) that function to generate a Request permit data packet. The Request permit data packet preferably includes a set of unique data, that includes an identifier of the distributed application 104' being invoked at the client, which is provided to the DA Interface 122 by way of the defined API. Once the Request permit data packet is created it is forwarded to the NSP 110 via the communications link 114', again by way of appropriate use of the defined API and the TSP communications module 116.

Program step 302 corresponds to executable instructions performed at the NSP 110. Here, the NSP 110 receives the Request permit data packet forwarded by the client. The NSP 110 can append data to the data packet that uniquely identifies the NSP 110. For instance, the identifying data could be the network service provider's certificate. The NSP 110 then forwards the request permit data packet to the application vendor 126 that corresponds to the particular application 104' that is requesting services. This is accomplished via a suitable communications link, as is shown at 320 in FIG. 6.

Program step 304 corresponds to the executable instructions performed at the application vendor 126. At this step, the application vendor 126 receives the request permit data packet from the NSP 110. Upon receipt, the vendor 126 reviews the data contained within the packet to identify the application 104' that is requesting services, and to identify the particular NSP 110 that proposes to provide network services for the application. A determination can then be made as to whether the vendor 126 wishes to revoke/deny the NSP's ability to provide network services for the requesting application 104'. The determination can be based upon whatever criteria apply. If access is revoked/denied, a permit packet is created having an appropriate flag or data value that indicates that the NSP is not authorized to provide the requested network services. If however at step 304 it is determined that the NSP 110 authorized, the secondary permit is created such that it indicates that the NSP 110 is authorized to proceed. In the preferred embodiment, the permit is created with a verification data set that includes a unique digital signature, created as described above with the vendor's 126 private key 127, as is indicated at program step 306. At program step 308, the permit is then forwarded, via the communications link 320, to the NSP 110.

Program step 309 corresponds to executable instructions performed at the NSP 110. Here, the secondary permit created by the vendor 126 is received at the NSP 110, and immediately forwarded to the requesting client via an appropriate communications link 114'.

At program step 310, which is executing at the client computer, the secondary permit is received from the NSP 110 and then verified. In the preferred embodiment, verification is accomplished by confirming the validity of the verification data contained within the permit, such as the authenticity of the digital signature appended to the permit. Again, confirmation of the digital signature is accomplished by utilizing the application vendor's certificate (152 in FIG. 3) in the manner described above. At program step 312, if the secondary permit is not valid and/or if it contains an appropriate flag or data value indicating that the NSP is no longer authorized, access to the NSP's network is denied, as is indicated at program step 310. A suitable error message can be presented on the client computer's display so as to inform the user 148 as to the nature of the failed operation—that the NSP is not authorized to provide services to the particular distributed application. If however the secondary permit is valid, then the client computer cpu allows the distributed application 104' to be launched on the distributed application network 102 via NSP 110, as is indicated at program step 200.

Since this alternative embodiment requires the distributed application to obtain confirmation of a NSP's authority every time the application is invoked (i.e., in "real time") an application vendor can easily revoke any previously granted authority. This gives an application vendor much greater control over a NSP's ability to provide services with respect to any application. Again, use of the permit mechanism insures greater flexibility, and yet can still be implemented without having to customize or change the actual distributed application.

In summary, the present invention is directed to a system and method that permits a vendor of a distributed application, such as a computer game, to selectively provide permissions to network service providers for using the vendor's distributed applications. Moreover, the permission is granted in a manner such that the distributed application itself does not have to be customized or preconfigured. In addition, the scheme allows permissions to be granted in such a way so as to prevent unauthorized network service providers from providing service. This ability to regulate use of distributed applications will enable new business models between network service providers and application vendors and will provide application vendors with an opportunity to gain additional revenue stream from service providers who are interested in supporting particular applications. Moreover, service providers will be able to add value to their service because they will be able to be in a position of exclusively hosting premium applications on their networks.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a distributed processing system that includes at least one network service provider (NSP) that is capable of providing network services to a plurality of remotely connected clients, including the ability to host use of a distributed application by the remotely connected clients, a method for regulating access to the distributed application via an NSP, the method comprising the following steps:

initiating, via a transport service provider (TSP) configured as a first driver, remote communications access to one of the NSPs by a client;

requesting access to the network services of the NSP on behalf of the distributed application executing at the client;

verifying, by a distributed application interface configured as a second driver, that the NSP is authorized to provide network services to the distributed application through the use of a permit created and issued by the vendor of the distributed application for which authorization is being granted; and allowing the distributed application to access the network services of the NSP only if the NSP is authorized to provide network services to the distributed application executing at the requesting client at the time the request is made, wherein the second driver is configured to provide a defined application program interface between the distributed application and the TSP communication services provided by the first driver so that the distributed application can be hosted by a variety of NSPs, regardless of the communications protocol used by such NSPs, and the authority of the NSPs to host the distributed application can be verified, without having to alter or customize the distributed application for any particular NSP.

2. A computer-readable medium having computer-executable instructions for performing the steps recited in claim 1.

3. A method as defined in claim 1, wherein the permit comprises at least one of the following verification parameters: an application identifier; a permit effective date; a permit expiration date; a public certificate containing a public key owned by a NSP; and a unique digital signature.

4. A method as defined in claim 3, wherein the application identifier comprises at least one of the following application parameters: a version number for the distributed application for which the permit is created; a release number for the distributed application for which the permit is created; and an application identifier code that identifies the distributed application for which the permit is created.

5. A method as defined in claim 3, wherein the digital signature is created by using a private encryption key owned by the vendor of the distributed application for which the permit is created.

6. A method as defined in claim 1, wherein the permit is verified at the client by receiving predetermined data parameters from the distributed application executing at the client and comparing the data parameters to at least one parameter contained within the verification data contained within the permit transferred to the client.

7. A method as defined in claim 6, wherein the parameters contained within permit that are compared to data parameters received from the distributed application include at least one of the following parameters: an application version number; an application release number; an application identifier code; a permit effective date; and a permit expiration date.

8. A method as defined in claim 1, wherein the permit is verified at the client by verifying the authenticity of a unique digital signature contained within the permit by using a public decryption key owned by the vendor of the distributed application for which the permit is created and contained within the distributed application executing at the client.

9. A method as defined in claim 1, wherein the permit comprises at least one of the following parameters:

(a) a version number of the distributed application for which authorization is being granted;

(b) a release number of the distributed application for which authorization is being granted;

(c) an application identifier code that identifies the distributed application for which authorization is being granted;

(d) a permit effective date;

(e) a permit expiration date;

(f) a public certificate containing a public key owned by the NSP to which the permit is to be issued; and (g) a digital signature generated so as to be unique to the contents of the permit.

10. A method as defined in claim 9 wherein the digital signature is created by using a private encryption key owned by the vendor of the distributed application for which the permit is created.

11. A method as defined in claim 1 further comprising the steps of:

(a) verifying at the client the identity if the NSP that transfers the permit; and (b) allowing the distributed application to access the network services of the NSP only if the identity of the NSP is confirmed.

12. A method as defined in claim 11, wherein the identity of the NSP is verified by utilizing a public decryption key contained within the permit to verify the authenticity of a digital signature appended to a communications module executing at the client to facilitate remote communications with the NSP.

13. A method as defined in claim 1, further comprising the steps of:

requesting that a secondary permit be provided to the client in the event that the transferred permit contains valid verification data;

verifying at the client that the secondary permit includes secondary verification data indicating that the NSP's authority to provide network services has not been revoked; and in the event that the NSP's authority has been revoked, preventing the distributed application from accessing the network services of the NSP.

14. A method as define in claim 13, wherein the secondary verification data comprises a unique digital signature created by the vendor of the distributed application executing at the client.

15. A method as defined in claim 14, wherein the digital signature included in the secondary verification data is created using a private encryption key owned by the vendor of the distributed application executing at the client.

16. A method as defined in claim 13, wherein the secondary permit is provided to the client by the NSP, and wherein the NSP receives the permit via a direct communications link to the vendor of the distributed application executing at the client.

17. A method as defined in claim 13, wherein the secondary permit is provided to the client by the vendor of the distributed application executing at the client via a direct communications link.

18. A method as defined in claim 13, wherein the client requests the secondary permit by forwarding a unique request permit packet to the vendor of the distributed application executing at the client.

19. A method as defined in claim 1, wherein the permit is provided to the client by the NSP, and wherein the NSP receives the permit via a direct communications link to the vendor of the distributed application executing at the client.

20. A method as defined in claim 1, wherein the permit is provided to the client by the vendor of the distributed application executing at the client via a direct communications link.

21. A method as defined in claim 1, wherein the client requests the permit by forwarding a unique request permit packet to the vendor of the distributed application executing at the client.

* * * * *

UNITED STATES PATENT AND TRADEMARK OFFICE
CERTIFICATE OF CORRECTION

PATENT NO.   : 6,374,357 B1                                                      Page 1 of 1
DATED        : April 16, 2002
INVENTOR(S)  : Sohail B. Mohammed and Kipley J. Olson It is certified that error appears in the above-identified patent and that said Letters Patent is hereby corrected as shown below:

Column 1,
Line 19, after "to enhance the" change "computers" to -- computer's --

Column 3,
Line 60, after "the permit" delete "."

Column 5,
Line 67, after "network service provider's" change "ASP)" to -- (NSP) --

Column 6,
Line 62, after "magnetic disk" insert -- 29 --

Column 14,
Line 9, after "as is shown" change "a" to -- at --

Column 21,
Line 14, after "client the identity" change "if" to -- of --

Signed and Sealed this

Twenty-second Day of October, 2002

*Attest:*

*Attesting Officer*

JAMES E. ROGAN
*Director of the United States Patent and Trademark Office*